United States Patent
Bastioli et al.

(10) Patent No.: US 9,012,573 B2
(45) Date of Patent: Apr. 21, 2015

(54) BIODEGRADABLE POLYESTER AND WRAPPING FILMS FOR PACKAGING PRODUCED THEREWITH

(75) Inventors: Catia Bastioli, Novara (IT); Stefano Facco, Novara (IT); Roberto Ponti, Oleggio (IT); Angelos Rallis, Novara (IT)

(73) Assignee: Novamont S.p.A., Novara (IT)

( * ) Notice: Subject to any disclaimer, the term of this patent is extended or adjusted under 35 U.S.C. 154(b) by 0 days.

(21) Appl. No.: 13/881,880

(22) PCT Filed: Oct. 27, 2011

(86) PCT No.: PCT/EP2011/068881
§ 371 (c)(1),
(2), (4) Date: Apr. 26, 2013

(87) PCT Pub. No.: WO2012/055973
PCT Pub. Date: May 3, 2012

(65) Prior Publication Data
US 2013/0217836 A1    Aug. 22, 2013

(30) Foreign Application Priority Data
Oct. 27, 2010   (IT) .......................... MI2010A001991

(51) Int. Cl.
*C08L 67/02*    (2006.01)
*C08G 63/183*    (2006.01)
*C08G 63/16*    (2006.01)
*C08J 5/18*    (2006.01)

(52) U.S. Cl.
CPC ................. *C08L 67/02* (2013.01); *C08G 63/16* (2013.01); *C08J 5/18* (2013.01); *C08G 63/183* (2013.01)

(58) Field of Classification Search
CPC .................................. C08I 7/02; C08G 63/183
USPC .......................................... 525/444; 528/302
See application file for complete search history.

(56) References Cited

U.S. PATENT DOCUMENTS

| 4,400,468 | A  | * | 8/1983 | Faber ............................ 435/142 |
| 2004/0068058 | A1 | * | 4/2004 | Bastioli et al. ................ 525/418 |
| 2008/0194770 | A1 | * | 8/2008 | Bastioli et al. ................ 525/411 |

FOREIGN PATENT DOCUMENTS

| WO | WO-2004/048471 A1 | 6/2004 | |
| WO | WO-2006/097353 A1 | 9/2006 | |
| WO | WO 2009118377 A1 * | 10/2009 | ............ C08G 63/91 |
| WO | WO-2009135921 A1 | 11/2009 | |
| WO | WO-2010/034710 A1 | 4/2010 | |

OTHER PUBLICATIONS

Shah et al., "Biological degradation of plastics: A comprehensive review," Biotechnology Advances, vol. 26, No. 3, May 1, 2008, pp. 246-265.
XP002666695—Database WPI Week 200444.

* cited by examiner

*Primary Examiner* — Mark Kaucher
(74) *Attorney, Agent, or Firm* — Novak Druce Connolly Bove + Quigg LLP

(57) ABSTRACT

This invention relates to a biodegradable polyester which is particularly suitable for use for the manufacture of wrapping films for packaging, comprising units deriving from at least one diacid and at least one diol, characterized by a high static friction coefficient in comparison with conventional biodegradable polyesters. A further object of this invention is a wrapping film comprising the said biodegradable polyester.

21 Claims, No Drawings

BIODEGRADABLE POLYESTER AND WRAPPING FILMS FOR PACKAGING PRODUCED THEREWITH

CROSS REFERENCE TO RELATED APPLICATIONS

This application is a National Phase filing under 35 U.S.C. §371 of PCT/EP2011/068881 filed on Oct. 27, 2011; and this application claims priority to Application No. MI2010A001991 filed in Italy on Oct. 27, 2010, under 35 U.S.C. §119; the entire contents of all are hereby incorporated by reference.

This invention relates to a biodegradable polyester which is particularly suitable for use for the preparation of wrapping films for packaging, comprising units deriving from at least one diacid and at least one diol, characterised by a high static friction coefficient in comparison with conventional biodegradable polyesters.

Another object of this invention is a wrapping film comprising said biodegradable polyester. Wrapping films for packaging (known as "cling films") are known in commerce and in the literature. These films are typically of the order of 6 to 20 μm thick and are for example used for the packaging of food products before the products are placed in a refrigerator or packed in containers.

An important and useful feature of these films is their property to adhere to themselves or other non-adhesive surfaces without the addition of an adhesive (cling ability). This property enables users to wrap one or more layers of film around an object (for example food on a plate) and thus to provide a hermetic seal for it.

A further feature is its transparency, which enables those using said films to identify an object wrapped in it, without the need to remove the object.

Hitherto however said wrapping films have been made using conventional polymers such as polyethylene and polyvinyl chloride. Although they have excellent performance in use, these films are not biodegradable and will therefore be dumped, contributing to the increasing environmental problems associated with the build-up and disposal of plastics materials.

If suitable functional properties could be maintained, the production of a new biodegradable wrapping film would be a desirable possibility, as this would help to reduce the problems associated with the build-up and disposal of these products.

All the limitations mentioned above will be overcome through the polyester according to this invention.

This invention in fact relates to a biodegradable polyester particularly suitable for use for the manufacture of wrapping films, comprising units deriving from at least one diacid and at least one diol and having:

Mn≥40000, preferably ≥45000

Mw/q≤90000, preferably ≤85000, more preferably ≤75000 wherein

"q"=weight percentage of polyester oligomers having molecular weight by GPC 10000, a film of said polyester having a static friction coefficient of more than 10, preferably of more than 20.

This invention also relates to a wrapping film comprising said biodegradable polyester and a process for producing said film.

Preferably the polyester has a melting point of 55-170° C. and an elastic modulus of more than 50 MPa.

It is also preferably characterised by a melt strength of 0.5-4 g, more preferably 1-3.5 g, and a shear viscosity of 500-1400 Pas, preferably 600-1300 Pas.

Melt strength is measured according to International Standard ISO 16790:2005, at 180° C. and $\gamma=103.7$ s$^{-1}$. A capillary of diameter 1 mm and L/D=30 is used for the measurement, at a constant acceleration of 12 mm/sec$^2$ and a stretching length of 110 mm.

With regard to the shear viscosity, this is determined at 180° C. and a flow gradient $\gamma=103.7$ s$^{-1}$ with a capillary having a diameter=1 mm and L/D=30 according to standard ASTM D-3835-90 "Standard Test Method for Determination of Properties of Polymeric Materials by Means of a Capillary Rheometer".

With regard to the static friction coefficient (COF), this expresses the resistance of the material to slip.

With regard to the polyester according to this invention, the static friction coefficient is determined according to a modification of standard ASTM D1894 "Static and Kinetic Coefficients of Friction of Plastic Film and Sheeting". According to this modification a "steel on film" static friction coefficient is determined.

The polyester according to this invention is in fact characterised by a film-on-film slip resistance which is so high that measurement of the friction coefficient under these conditions results in deformation and even breakage of the film sample applied to the slider during the determination.

For the purposes of this invention the static friction coefficient is therefore measured in the manner described below.

A sample of the polyester according to this invention, in the form of a flexible film of thickness between 3 and 50 micron, is wound around a glass sheet which covers the supporting plane measuring approximately 150×300 mm with a thickness of 2 mm. The film sample must adhere perfectly to the glass panel and must have a smooth surface free from folds. In order to achieve this condition a brush may be used with moderate pressure to remove air bubbles that might form between the film and the glass panel. The said panel is placed in a horizontal position and a slider of stainless steel weighing 200±5 grams measuring 63.5 along the sides and 5 mm thick is placed upon it. To encourage adhesion between the slider and the film surface moderate pressure is applied to its surface. One end of the slider is connected by a nylon filament to the load cell which is positioned on the moving cross-member of the dynamometer and can move at a constant rate of 10 mm/min. The static friction coefficient is defined as the ratio between the force (F) recorded by the dynamometer at the time when the adhesion between the slider and the film falls (tangential friction force opposing sliding) and the force of the weight (Fg) acting perpendicular to the two contact surfaces (force due to the weight of the steel slider).

Preferably the polyester according to this invention has a gel fraction of less than 5%, more preferably less than 3%, even more preferably less than 1%.

The gel fraction is determined by placing a sample of polyester ($X^1$) in chloroform, then filtering the mixture through a 25-45 μm sieve and measuring the weight of the resin remaining on the filtration mesh ($X^2$). The gel fraction is determined as the ratio of the material so obtained to the weight of the sample, i.e. $(X^2/X^1) \times 100$.

The polyester according to this invention is advantageously selected from aliphatic and aliphatic-aromatic biodegradable polyesters, aliphatic-aromatic polyesters being particularly preferred among these.

With regard to aliphatic polyesters, these are obtained from at least one aliphatic diacid and at least one aliphatic diol.

With regard to the aliphatic-aromatic polyesters, the aromatic part thereof comprises mainly at least one multifunctional aromatic acid and the aliphatic part comprises at least one aliphatic diacid and at least one aliphatic diol.

By multifunctional aromatic acids are meant dicarboxylic aromatic compounds of the type of phthalic acid and its esters and heterocyclic dicarboxylic aromatic compounds of renewable origin and their esters. 2,5-furandicarboxylic acid and its esters and terephthalic acid and its esters, and mixtures thereof, are particularly preferred.

Those products obtained from sources which because of their intrinsic nature are regenerated in nature over the timescale of a human lifetime and by extension those whose use does not prejudice natural resources for future generations are to be regarded as of renewable origin. A typical example of a renewable source comprises plant crops.

By aliphatic diacids are meant aliphatic dicarboxylic acids having a number of between 2 and 22 carbon atoms in the main chain and their esters. Dicarboxylic acids from renewable sources, their esters and their mixtures are preferred, and of these adipic acid, pimelic acid, suberic acid, sebacic acid, azelaic acid undecandioic acid, dodecandioic acid, brassilic acid and their mixtures are preferred.

In a particularly preferred embodiment the aliphatic diacids of the biodegradable polyester according to this invention comprise at least 50% in moles of sebacic acid, azelaic acid or mixtures thereof in comparison with the total moles of aliphatic diacids. Sebacic acid is particularly preferred.

Diacids with unsaturations within the chain such as for example itaconic acid and maleic acid are also included.

In the polyester according to this invention by diols are meant compounds having two hydroxyl groups. $C_2$ to $C_{13}$ aliphatic diols are preferred.

Examples of aliphatic diols include: 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimetanol, neopentylglycol, 2-methyl-1,3-propandiol, dianhydrosorbitol, dianhydromannitol, dianhydroiditol, cyclohexandiol, cyclohexanmethandiol and their mixtures. Among these 1,4-butandiol, 1,3-propandiol and 1,2-ethandiol and their mixtures are particularly preferred. In a particularly preferred embodiment the diols of the biodegradable polyester according to this invention comprise at least 50% in moles and preferably at least 80% in moles of 1,4-butandiol in comparison with the total moles of diols.

The aromatic aliphatic polyesters are characterised by a multifunctional aromatic acids content of between 30-70% in moles, preferably between 40-60% in moles in comparison with the total content of dicarboxylic acids in moles.

Advantageously, branched compounds may be added to the aliphatic and aliphatic-aromatic polyesters in a quantity of less than 0.5% and preferably less than 0.2% in moles with respect to the total dicarboxylic acids content in moles. The said branching compounds are selected from the group of multifunctional molecules such as for example polyacids, polyols and their mixtures.

Examples of polyacids are: 1,1,2-ethantricarboxylic acid, 1,1,2,2 ethantetracarboxylic acid, 1,3,5 pentatricarboxylic acid, 1,2,3,4 cyclopentatetracarboxylic acid, malic acid, citric acid, tartaric acid, 3-hydroxyglutaric acid, mucic acid, trihydroxyglutaric acid, hydroxyisophthalic acid, their derivatives and their mixtures.

Examples of polyols are: glycerol, hexantriol, pentaerythritol, sorbitol, trimethylolethane, trimethylolpropane, mannitol, 1,2,4-butantriol, xylitol, 1,1,4,4-tetrakis(hydroxymethyl) cyclohexane, arabitol, adonitol, iditol and their mixtures.

The aliphatic and aliphatic polyesters advantageously contain co-monomers of the hydroxy acid type in percentages of not more than 30% and preferably not more than 20% in moles with respect to the total dicarboxylic acids content in moles. These may be present with the distribution of the repetitive units being of the random or block type.

Hydroxy acids of the D- and L-lactic, glycolic, butyric, valeric, hexanoic, heptanoic, octanoic, nonanoic, decanoic, undecanoic, dodecanoic, tridecanoic, tetradecanoic, pentadecanoic, hexadecanoic, heptadecanoic and octadecanoic acid type are preferred.

Hydroxyacids of the type with 3 or 4 carbons in the main chain are preferred.

Mixtures of different polyesters according to this invention also form part of the invention.

For the purposes of this invention by biodegradable polyesters are meant biodegradable polyesters according to standard EN 13432.

The polyester according to this invention may be used in a mixture, obtained also by reactive extrusion processes, with one or more polymers of synthetic or natural origin, which may or may not be biodegradable.

Preferably said reactive extrusion process is carried out through the addition of peroxides, epoxides or carbodiimides.

Preferably the said reactive extrusion process is carried out with peroxides in a quantity in the range between 0.001-0.2% and preferably between 0.001-0.1% by weight with respect to the sum of the polymers fed to the reactive extrusion process.

With regard to the addition of epoxides, these are preferably used in quantities of 0.1-2%, more preferably 0.2-1% by weight with respect to the sum of the polymers fed to the reactive extrusion process.

In the case where carbodiimides are used, these are preferably used in quantities of 0.05-2%, more preferably 0.1-1% by weight with respect to the sum of the polymers fed to the reactive extrusion process.

It is also possible to use mixtures of the said peroxides, epoxides and carbodiimides.

Examples of peroxides which may advantageously be used are selected from the group of dialkyl peroxides such as for example: benzoyl peroxide, lauroyl peroxide, isononanoyl peroxide, di-(t-butylperoxyisopropyl)benzene, t-butyl peroxide, dicumyl peroxide, alpha-alpha'-di(t-butylperoxy)diisopropylbenzene, 2,5-dimethyl-2,5-di-(t-butylperoxy)hexane, t-butyl cumyl peroxide, di-t-butylperoxide, 2,5-dimethyl-2, 5-di(t-butylperoxy)hex-3-yne, di(4-t-butylcyclohexyl) peroxydicarbonate, dicetyl peroxydicarbonate, dimyristyl peroxydicarbonate, 3,6,9-triethyl-3,6,9-trimethyl-1,4,7-triperoxonane, di(2-ethylhexyl) peroxydicarbonate and their mixtures.

Examples of epoxides which may advantageously be used are all the polyepoxides from epoxidated oils and/or styrene—glycidylether-methylmethacrylate, glycidylether methylmethacrylate, in a range of molecular weights between 1000 and 10000 with the number of epoxides per molecule in the range from 1 to 30 and preferably between 5 and 25, the epoxides being selected from the group comprising: diethylene glycol, diglycidyl ether, polyethylene glycol, diglycidyl ether, glycerol polyglycidyl ether, diglycerol polyglycidyl ether, 1,2-epoxybutane, polyglycerol polyglycidyl ether, isoprene diepoxide, and cycloaliphatic diepoxides, 1,4-cyclohexandimethanol diglycidyl ether, glycidyl 2-methylphenyl ether, glycerolpropoxylate triglycidyl ether, 1,4-butandiol diglycidyl ether, sorbitol polyglycidyl ether, glycerol diglycidyl ether, tetraglycidyl ether of meta-xylene diamine and the diglycidyl ether of bisphenol A and their mixtures.

Catalysts may also be used to render the reactivity of the reactive groups higher. In the case of polyepoxides, salts of fatty acids may for example be used. Calcium and zinc stearates are particularly preferred.

Examples of carbodiimides which can advantageously be used are selected from the group comprising: poly(cyclooctylene carbodiimide), poly(1,4-dimetylenecyclohexylene carbodiimide), poly(cyclohexylene carbodiimide), poly(ethylenecarbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylide carbodiimide)poly(2,2',6,6'-tetraisopropyldiphenylene carbodiimide) (Stabaxol® D), poly(2,4,6-triisopropyl-1,3-phenylene carbodiimide) (Stabaxol® P-100), poly(2,6-diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthalene carbodiimide), poly(isophorone carbodiimide), poly (cumene carbodiimide), p-phenylene bis (ethylcarbodiimide), 1,6-hexamethylene bis (ethylcarbodiimide), 1,8-octomethylene bis (ethylcarbodiimide), 1,10-decamethylene bis (ethylcarbodiimide), 1,12 dodecamethylene bis (ethylcarbodiimide) and their mixtures.

In particular the polyester according to the invention may be used in a mixture with biodegradable polyesters of the diacid-diol type, from a hydroxy acid or of the polyester-ether type.

With regard to the said biodegradable polyesters of the diacid-diol type, these may be either aliphatic or aliphatic-aromatic.

The said biodegradable aliphatic polyesters of diacid-diol comprise aliphatic diacids and aliphatic diols, while the said biodegradable aliphatic-aromatic polyesters have an aromatic part comprising mainly multifunctional aromatic acids of both synthetic and renewable origin, and the aliphatic part comprises aliphatic diacids and aliphatic diols.

The said biodegradable aliphatic aromatic polyesters from diacids-diols are preferably characterised by an aromatic acids content of between 30 and 90% in moles, preferably between 45 and 70% in moles with respect to the acid component.

Preferably the multifunctional aromatic acids of synthetic origin are aromatic dicarboxylic compounds of the phthalic acid type and their esters, preferably terephthalic acid.

The multifunctional aromatic acids of renewable origin are preferably selected from the group comprising 2,5 furandicarboxylic acid and its esters.

Particularly preferred are biodegradable aliphatic-aromatic polyesters from diacids-diols in which the aromatic diacid component comprises a mixture of multifunctional aromatic acids of synthetic and renewable origin.

The aliphatic diacids of the biodegradable diacid-diol polyesters are aliphatic dicarboxylic acids having a number of between 2 and 22 carbon atoms in the main chain and their esters. Dicarboxylic acids from renewable sources, their esters and their mixtures are preferred, and among these adipic acid, pimelic acid, suberic acid, sebacic acid, azelaic acid, undecandioic acid, dodecandioic acid, brassilic acid and their mixtures are preferred.

Examples of aliphatic diols in the biodegradable polyesters from diacids-diols are: 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimetanol, neopentylglycol, 2-methyl-1,3-propandiol, dianhydrosorbitol, dianhydromannitol, dianhydroiditol, cyclohexandiol, cyclohexanmethandiol and their mixtures. Of these 1,4-butandiol, 1,3-propandiol and 1,2 ethandiol and their mixtures are particularly preferred.

Preferably the mixtures of polyesters according to the invention with the biodegradable polyesters of diacid diols described above are characterised by a content of the said biodegradable polyesters which varies within the range between 5-95% by weight, more preferably between 10-90% by weight with respect to the sum of the weights of the copolyester according to the invention and the latter respectively.

It is also possible to mix the polyester according to the invention with more than one aliphatic-aromatic polyester having an aromatic part mainly comprising multifunctional aromatic acids of either synthetic or renewable origin or their mixtures.

Either binary or ternary mixtures of the polyester according to the invention with the said polyesters are also particularly preferred.

With regard to the mixture of polyesters according to the invention, the preferred biodegradable polyesters from hydroxy acid are: poly L-lactic acid, poly D-lactic acid and the stereo complex of poly-D-L-lactic acid, poly-c-caprolactone, polyhydroxybutyrate, polyhydroxybutyrato-valerate, polyhydroxybutyrato-propanoate, polyhydroxybutyrato-hexanoate, polyhydroxybutyrato-decanoate, polyhydroxybutyrato-dodecanoate, polyhydroxybutyrato-hexadecanoate, polyhydroxybutyrato-octadecanoate, poly 3-hydroxybutyrato-4-hydroxybutyrate.

Preferably the mixtures of the polyester according to the invention with the biodegradable polyesters of hydroxy acid described above are characterised by a content of the said biodegradable polyesters which varies within the range between 1-20% by weight, more preferably between 1-15% by weight with respect to the sum of the weights of the copolyester according to the invention and the latter respectively.

In a particularly preferred embodiment the polyester according to this invention is mixed with 3-10% by weight of a polymer of polylactic acid containing at least 75% of L-lactic or D-lactic acid or combinations thereof having a molecular weight Mw of over 30,000.

The said mixtures are advantageously produced through reactive extrusion processes between the polyester according to this invention and the said polymer of polylactic acid preferably in the presence of organic peroxides such as those described above.

The polyester according to the invention may also be used in a mixture with polymers of natural origin such as for example starch, cellulose, chitin, chitosan, alginates, proteins such as glutein, zein, casein, collagen, gelatine, natural rubbers, rosinic acids and their derivatives, unpurified, purified hydrolysed, basified, etc., lignins or their derivatives. The starches and cellulose may be modified and of these mention may be made for example of esters of starch or cellulose having a substitution level of between 0.2 and 2.5, hydroxypropylate starches, starches modified with fatty chains, cellophane. Mixtures with starch are particularly preferred. Starch may also be used in both the destructured and gelatinised or filler form. Starch may represent the continuous or the dispersed phase, and may be in a co-continuous form. In the case of dispersed starch the starch is preferably in a form smaller than one micron and more preferably less than 0.5 μm in average diameter.

Preferably mixtures of the polyester with the polymers of natural origin described above are characterised by a content of the said polymers of natural origin which varies within the range between 1-30% by weight, more preferably between 2-15% by weight with respect to the sum of the weights of the copolyester according to the invention and the latter respectively.

The polyester according to the invention may also be used in a mixture with polyolefin, non-biodegradable polyesters, polyester-urethanes, polyether-urethanes, polyurethanes, polyamides, polyamino acids, polyethers, polyureas, polycarbonates and mixtures thereof.

Of the polyolefins, polyethylene, polypropylene, their copolymers, polyvinyl alcohol, polyvinyl acetate, polyethylvinyl acetate and polyethylene vinyl alcohol are preferred.

Of the non-biodegradable polyesters, PET, PBT, PTT are preferred, in particular with a renewables content >30% and polyalkylene furan dicarboxylates. Of the latter polyethylene furan dicarboxylate, polypropylene furan dicarboxylate, polybutylene furan dicarboxylate and their mixtures are preferred.

Examples of polyamides are: polyamide 6 and 6.6, polyamide 9 and 9.9, polyamide 10 and 10.10, polyamide 11 and 11.11, polyamide 12 and 12.12 and their combinations of the 6/9, 6/10, 6/11, 6/12 type.

The polycarbonates may be polyethylene carbonates, polypropylene carbonates, polybutylene carbonates, their mixtures and copolymers.

The polyethers may be polyethylene glycols, polypropylene glycols, polybutylene glycols, their copolymers and their mixtures having molecular weights from 70,000 to 500,000.

Preferably mixtures of the polyester according to the invention with the polymers described above (polyolefins, non-biodegradable polyesters, polyester- and polyether-urethanes, polyurethanes, polyamides, polyamino acids, polyethers, polyureas, polycarbonates and mixtures thereof) are characterised by a content of the said polymers varying within the range between 0.5-99% by weight, more preferably between 5-50% by weight with respect to the sum of the weights of the polyester according to the invention and the latter respectively.

The process for producing the polyester according to this invention may take place according to any of the known processes in the state of the art.

In particular the polyester may advantageously be obtained through a polycondensation reaction. Advantageously the process of polymerising the polyester may be carried out in the presence of a suitable catalyst. Organometallic compounds of tin, for example derivatives of stannoic acid, titanium compounds, for example orthobutyl titanate, compounds of aluminium, for example triisopropyl Al, antimony and zinc may be mentioned by way of example as suitable catalysts.

It is well known that an increase of the molecular weight of the polymer may be obtained by lengthening the polymerization time, either in the molten state or in the solid state, or adding chain extenders such as peroxides, epoxides or carbodiimides.

The skilled person is therefore able to determine the proper polymerization conditions, necessary to obtain the desired molecular weight, by varying polymerization time or adding chain extenders.

The polyester according to this invention is also advantageously obtainable through a reactive extrusion process from a polyester precursor comprising units deriving from at least one diacid and at least one substantially linear diol with an MFI of 5-30 dl/g at 190° C. and 2.16 kg, having a weight average molecular weight $M_w$ measured by GPC of between 60,000-120,000 and a content of active sites such as unsaturations in quantities of 0.1-1% in moles and/or terminal acid groups in quantities of 10-200 meq of KOH, the said reactive extrusion process being carried out with the addition of a compound selected from peroxides, epoxides or carbodiimides such as those described above.

Preferably the said reactive extrusion process is carried out with peroxides in a quantity in the range between 0.001-0.2% and preferably between 0.01-0.1% by weight with respect to the sum of the polymers fed to the reactive extrusion process.

As regards the addition of epoxides, these are preferably used in quantities of 0.1-2%, more preferably 0.2-1% by weight with respect to the sum of the polymers fed to the reactive extrusion process.

In the case where carbodiimides are used, these are preferably used in quantities of 0.05-2%, more preferably 0.1-1% by weight with respect to the sum of the polymers fed to the reactive extrusion process.

Mixtures of the said peroxides, epoxides and carbodiimides may also be used.

Preferably the said precursor polyester has an MFI of 5-30 and more preferably 7-20 g/10 min at 190° C. and 2.16 kg, a shear viscosity of 400-700 Pas and a mean rated molecular weight $M_w$ of preferably between 100,000-130,000.

Preferably the said precursor polyester has an unsaturations content of 0.1-0.8% and more preferably 0.2-0.7% in moles.

The unsaturations may be generated in situ during the polymerisation stage or processing of the precursor polymer or through the insertion of suitable unsaturated monomers or unsaturated chain terminations.

Polyesters with terminal unsaturations are particularly preferred.

Of unsaturated chain terminations, those having the following structure are preferred:

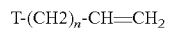

in which "T" is a group capable of reacting with carboxyl and/or hydroxyl groups, for example a hydroxyl, carboxyl, amine, amide or ester group, and "n" is a whole number between 0 and 13.

The said unsaturated chain terminations may also be used in the mixture.

With regard to "T", this is preferably a hydroxyl or carboxyl group.

The whole number "n" is preferably between 1 and 13, more preferably between 3 and 13 and even more preferably between 8 or 9.

Of the unsaturated chain terminations omega-undecanoic acid, omega-undecenyl alcohol and their mixtures are particularly preferred.

The presence of unsaturations and/or adducts deriving from the reactions of these following reactive extrusion may be determined by different methods well known to those skilled in the arts such as NMR spectroscopy or methanolysis reactions of the polymer chain coupled with chromatographic methods combined with mass spectrometry.

Those skilled in the art will easily be able to identify structures relating to the unsaturations as such or the adducts deriving from the reaction of these following reactive extrusion.

With regard to the measurement of unsaturations content by NMR, this may be performed using 300 MHz H1 NMR using an impulse-acquisition sequence characterised by an impulse phase of 30°, a spectral amplitude=4 kHz, and a delay of 5 seconds, performing 6000 scans.

Preferably the polyester according to the invention may be obtained using a reactive extrusion process from a precursor polyester having a terminal acid groups content in a quantity of 35-150 meq of KOH/kg of polyester.

The terminal acid groups content may be determined as follows: place 1.5-3 g of the polyester in a 100 ml flask together with 60 ml of chloroform. After the polyester has completely dissolved add 25 ml of 2-propanol and immediately before analysis 1 ml of deionised water. Titrate the solution so obtained against a previously standardised solution of KOH in ethanol. Use an appropriate indicator, such as for example a glass electrode for acid-based titrations in non-aqueous solvents to determine the end point of the titration. Calculate the terminal acid groups content on the basis of the consumption of the KOH solution in ethanol using the following equation:

Terminal acid groups content $$\text{(meq KOH/kg of polymer)} = \frac{\lfloor (V_{eq} - V_b) \cdot T \rfloor \cdot 1000}{P}$$

in which $V_{eq}$=ml of KOH solution in ethanol at the end point for titration of the sample,
$V_b$=ml of KOH solution in methanol required to achieve a pH=9.5 during the blank titration,
T=concentration of the KOH solution in ethanol expressed in moles/liter,
P=weight of the sample in grams.

The process for production of the precursor polyester may be performed according to any of the known processes in the state of the art mentioned above.

The molecular weights Mn and Mw are measured by gel permeation chromatography (GPC). Determination may be performed using the chromatographic system at 40° C., with a set of three columns in series (particle diameter 5μ and porosities of 500 A, 1000 A and 10,000 A respectively), a refractive index detector, chloroform as eluent (flow 1 ml/min) and polystyrene as reference standard.

As regards to the weight percentage of polyester oligomers having molecular weight ≤10000, it is determined as follows: a sample ($F_1$) of the polyester (about 3-4 g) are placed in a 200 ml flask together with 30 ml of chloroform. After complete dissolution of the polyester, 100 ml of a 1:1 v/v solution of methanol with acetone are added and the mixture is then left under stirring for 2 hours.

The mixture is then filtered through a paper filter having pore size of 8 μm, the polymer remaining on the filter being then rinsed with acetone.

The methanol/acetone solution is then completely evaporated by heating at 70° C. under a small air flow and the weight of the remaining solid fraction is recorded ($F_2$).

A sample of the solid fraction (about 10 mg) is dissolved in 10 ml of chloroform and analyzed by GPC according to the method above disclosed. The percentage ($P_1$) of polymer chains having molecular weight ≤10000 is determined on the basis of the molecular weight distribution curve recorded by the GPC instrument.

The weight percentage of polyester oligomers having molecular weight ≤10000 ("q") is calculated according to the following equation:

$$\text{"}q\text{"} = (P_1 * F_2)/F_1$$

The determination of Mn, Mw and of "q" may be performed either on the polyester pellets or on the films obtained therefrom.

The Mw/"q" ratio of the polyester according to the present invention may be varied by the skilled person either by adding polyester oligomers during the polymerization process or by generating them through high temperature treatments.

With high temperature treatments are meant polymerization process steps during which the temperature is brought above 200° C., preferably 230° C., in a closed environment for the time necessary to generate said polyester oligomers. It is known monitoring the polyester oligomers content during the thermal treatment by sampling the melt polyester and analyzing it with the method above disclosed.

Said high temperature treatments may be performed either at the end of the polymerization in the polymerization reactor or, alternatively, in an extruder or any analogous device capable of providing temperature and shear forces.

In general, the polyester oligomers content increases with increasing treatment time and temperature. The skilled person is therefore able to determine the proper treatment conditions for obtaining the desired polyester oligomers content by varying these parameters, also in view of the type and terminal groups of the polyester and of the catalytic system.

This invention also relates to a wrapping film obtained from the said biodegradable polyester and the process of producing the said film. The said film has properties which make it suitable for many practical applications associated with domestic and industrial consumption. Examples of these applications are the packaging of food and non-food items, industrial packaging (e.g. pallets), baling in agriculture, the wrapping of waste.

Its physical and chemical properties enable the polyester according to the invention to be effectively fed to plant for the production of conventional wrapping films typically used for PE or PVC without any modifications to the structure and conditions of use of the machinery. Thanks to the specific combination of rheological properties and the static friction coefficient of the polyester according to this invention the said film may also advantageously be produced through blowing film-forming processes in which the bubble can be broken making it possible to collect spools of single layer film downstream from the film-forming process. This feature is particularly advantageous in terms of the productivity of the production process.

The characteristics of the polyester according to this invention make it possible to produce extremely thin films of the order of 3 microns.

The film obtained from the biodegradable polyester according to this invention has a high ability to cling to itself and to other non-adhesive surfaces, such as for example ceramic, glass, metal and plastics such as for example HDPE, LDPE, PP, PET, PVC.

Thanks to the physical and chemical properties of the polyester according to this invention the wrapping film obtained from the said polyester can also be produced without the use of plasticisers or tackifiers such as for example polyisobutene or ethylene vinyl acetate. This makes it possible to appreciate a further significant difference between the film according to this invention and PVC and polyethylene wrapping films, which because of the presence of the abovementioned additives have significant restrictions on their use in the food packaging sector.

In a particularly preferred embodiment the wrapping film obtained from the polyester according to this invention is substantially free of plasticisers and tackifiers.

The wrapping film obtained from the biodegradable polyester according to this invention also has excellent mechanical properties which through a specific combination of tearability, robustness and extensibility make it particularly suitable for use in both the industrial and food packaging sectors.

Preferably the said wrapping film has a tear strength of >70 N/mm, an elongation on failure of >400%, an elastic modulus >50 MPa and an ultimate tensile strength of >25 MPa in the transverse direction with respect to the direction of film-forming and a tear strength of >50 N/mm, an elongation on failure >200%, an elastic modulus >100 MPa and an ultimate tensile strength of >30 MPa in the longitudinal direction with respect to the direction of film-forming.

With regard to mechanical properties, in the meaning of this invention these will be determined according to standards ASTM D882 (tensile strength at 23° C. and 55% relative humidity and Vo=50 mm/min) and ASTM D1922 (tearing at 23° C. and 55% relative humidity).

The wrapping film obtained from the biodegradable polyester according to this invention is advantageously characterised by excellent optical properties. In particular it preferably has Haze values <15, more preferably <10%, even more preferably <7% and Transmittance values of more than 80%, preferably over 90%, so that users can identify an object wrapped in it without the need to remove the object. The said property is extremely advantageous when used for the packaging of foodstuffs.

With regard to optical properties, these are determined according to standard ASTM D1003.

In addition to the properties mentioned above, the wrapping film obtained from the biodegradable polyester according to this invention advantageously has water vapour permeability values which are very much greater than those of PVC and PE wrapping films. In particular this preferably demonstrates VWTR values of more than 150 g/m²·day measured at 23° C., 50% RH.

With regard to permeability properties, these are determined according to standard ASTM E96 (dish method).

The invention will now be illustrated by an embodiment which is intended to be purely by way of example and not limiting within the scope of the protection of this patent application.

In the Examples, Mn, Mw and "q" were determined by GPC according to the method herein disclosed. Tensile mechanical properties were determined according to standard ASTM D882 (traction at 23° C., 55% relative humidity and Vo=50 mm/min), optical properties according to standard ASTM D1003 and Static Friction Coefficient according to the method above disclosed in the description.

EXAMPLES 1-3

A poly(butylenesebacate-co-butyleneterephthalate) (PBST) having a terephthalic acid content=56% in moles, with an MFI=2.6 (at 190° C. and 2.16 kg), a Shear Viscosity of 1220 Pas and a Melt Strength of 3.1 g was synthesised.

The polyester was analyzed by gel permeation chromatography (Agilent® 1100) using a refraction index detector. The eluent consisted of CHCl3 with a flow of 1 ml/min. the system was thermostat-controlled at 40° C. A set of three columns was used, with a particle diameter of 5 µm and a porosity of 500 Å, 1000 Å and 10000 Å respectively.

The molecular weight was determined using polystyrene as a reference standard obtaining:

Mn=85215;

Mw=176840.

3 g of the polyester were also analyzed for determining the percentage of polyester oligomers having molecular weight ≤10000 ("q") according to the method above disclosed in the description, showing a value of 1.7%.

270 kg of this PBST in the form of granules were filmed with a 40 mm Ghioldi machine, die gap=1 mm, flow rate 20 kg/h in order to obtain three films with a thickness of 20 µm (10+10) according to three different filming filming parameters:

| Ex. | Filming temperature (° C.) | Blowing ratio | Stretch ratio |
|---|---|---|---|
| 1 | 170 | 2.5 | 36 |
| 2 | 220 | " | " |
| 3 | 270 | " | " |

EXAMPLE 4

A composition consisting of:

25 parts by weight of a first PBST according to the Examples 1-3, 70 parts by weight of a poly(butylenesebacate-co-butyleneadipate-butyleneterephthalate) (PBSAT) having an adipic acid content of 35% by moles with respect to the sum of the aliphatic diacids, a terephthalic acid content=56% in moles with respect to the sum of the aliphatic and aromatic diacids, with a MFI=7 (at 190° C. and 2.16 kg), a Shear Viscosity of 800 Pas, a Melt Strength of 0.6 g Mn of 79724, Mw of 147010 and "q" of 1.6, parts by weight of a second PBST having a terephthalic acid content=56% in moles with respect to the sum of the aliphatic and aromatic diacids, with a MFI=80 (at 190° C. and 2.16 kg), a Mn 40037 and Mw of 75127, were fed to a 40 mm Ghioldi film blowing machine, having die gap=1 mm, flow rate 20 kg/h, filming temperature=170° C., blowing ratio=2.5 and stretching ratio=36.

The films of Examples 1, 2, 3 and 4 were characterized and the properties are reported in Table 1.

TABLE 1

CHARACTERIZATION OF THE FILMS

| Ex | Oligomers content ("q") | Mw | Mn | Mw/q | $\sigma_b$ (MPa) | $\epsilon_b$ (%) | E (MPa) | Transmittance (%) | Haze (%) | COF | Cling ability |
|---|---|---|---|---|---|---|---|---|---|---|---|
| 1 | 1.7 | 174390 | 84664 | 102582 | 51 | 222 | 152 | 93 | 16 | 4 | − |
| 2 | 1.9 | 162430 | 74027 | 85489 | 45 | 239 | 137 | 93 | 12 | 12 | + |
| 3 | 2.7 | 162020 | 71043 | 60007 | 31 | 494 | 91 | 93 | 2 | 32 | +++ |
| 4 | 2.9 | 132990 | 59938 | 45858 | 41 | 362 | 108 | 93 | 2 | 33 | +++ |

The cling ability of the films according to Examples 2-4 was found to be comparable to that of commercial cling films made of conventional polymers such as polyethylene and polyvinylchloride, proving to be effective for the packaging of food products.

The invention claimed is:

1. Biodegradable polyester suitable for use for the manufacture of wrapping films, said polyester having melt strength of 1-3.5 g and comprising units deriving from at least one diacid and at least one diol and having:
   $Mn \geq 40000$
   $Mw/q \leq 90000$,
   wherein
   "q"=weight percentage of polyester oligomers having molecular weight by GPC $\leq 10000$,
   a film of said polyester having a static friction coefficient of more than 10.

2. Biodegradable polyester according to claim 1 in which the polyester is selected from the group consisting of biodegradable aliphatic and aliphatic-aromatic polyesters.

3. Biodegradable polyester according to claim 2, in which the said aliphatic polyesters comprise at least one aliphatic diacid and at least one aliphatic diol.

4. Biodegradable polyester according to claim 2, in which the said aliphatic-aromatic polyesters have an aromatic part comprising at least one multifunctional aromatic acid and an aliphatic part comprising at least one aliphatic diacid and at least one aliphatic diol.

5. Biodegradable polyester according to claim 4, in which the multifunctional aromatic acids are selected from the group consisting of aromatic dicarboxyl compounds of the phthalic acid type and heterocyclic dicarboxylic aromatic compounds of renewable origin and their esters, and mixtures thereof.

6. Biodegradable polyester according to claim 5, in which the content of multifunctional aromatic acids is between 30-70% in moles with respect to the total content of dicarboxylic acids in moles.

7. Biodegradable polyester according to claim 3, in which the aliphatic diacids are aliphatic dicarboxylic acids having a number of between 2 and 22 carbon atoms in the main chain and their esters.

8. Biodegradable polyester according to claim 7, in which the said aliphatic dicarboxylic acids are from a renewable source.

9. Biodegradable polyester according to claim 8, in which the said aliphatic dicarboxylic acids from a renewable source are selected from the group consisting of adipic acid, pimelic acid, suberic acid, sebacic acid, azelaic acid, undecandioic acid, dodecandioic acid, brassilic acid and their mixtures.

10. Mixture comprising the biodegradable polyester according to claim 1 with one or more polymers of synthetic or natural origin.

11. Mixture comprising the polyester according to claim 10, wherein the said one or more polymers of synthetic or natural origin is biodegradable.

12. Mixture according to claim 11, in which the said biodegradable polymer is a biodegradable polyester of the diacid diol, hydroxyacid or polyester-ether type.

13. Mixture according to claim 12, in which the said biodegradable polyester of the diacid-diol type is aliphatic.

14. Mixture according to claim 12, in which the said biodegradable polyester of the diacid-diol type is aliphatic-aromatic.

15. Mixture according to claim 12, in which the said biodegradable polyester is selected from the group consisting of a hydroxy acid is poly L-lactic, poly D-lactic and a stereo complex of poly D-L-lactic acid, poly-c-caprolactone, polyhydroxybutyrate, polyhydroxybutyrato-valerate, polyhydroxybutyrato propanoate, polyhydroxybutyrato hexanoate, polyhydroxybutyrato decanoate, polyhydroxybutyrato dodecanoate, polyhydroxybutyrato octodecanoate, poly3-hydroxybutyrato-4-hydroxybutyrate.

16. Mixture according to claim 10, in which the said polymer of natural origin is selected from the group consisting of starch, cellulose, chitin, chitosan, alginates, protein, natural rubbers, rosinic acid and its derivatives, lignin or their derivatives.

17. Mixture according to claim 10, in which the said polymer is selected from the group consisting of a polyolefin, a non-biodegradable polyester, a polyester-urethane, a polyether-urethane, a polyurethane, a polyamide, a polyamino acid, a polyether, a polyurea, a polycarbonate and mixtures thereof.

18. Mixture according to claim 10, obtained by reactive extrusion.

19. Wrapping film comprising the biodegradable polyester according claim 1 or a mixture comprising said biodegradable polyester and one or more biodegradable polymers of synthetic or natural origin.

20. Wrapping film according to claim 19, substantially free from plasticisers and tackifiers.

21. Wrapping film according to claim 19, for the packaging of foodstuffs, for industrial packaging, for baling in agriculture, for wrapping refuse.

* * * * *